United States Patent [19]
Kato et al.

[11] 3,938,060
[45] Feb. 10, 1976

[54] DEVICE FOR MODULATING INTENSITY OF LIGHT RAYS GENERATED FROM GAS LASER

[76] Inventors: Masahiko Kato, No. 37-3, Shimoyotsugi, Akita, Nishitama, Tokyo; Asao Hayashi, No. 914, Komiya-cho, Hachioji, Tokyo; Takeomi Suzuki, No. 182, Higashioizumi, Nerima, Tokyo, all of Japan

[22] Filed: Dec. 11, 1974

[21] Appl. No.: 531,820

Related U.S. Application Data
[63] Continuation of Ser. No. 289,218, Sept. 15, 1972, abandoned.

[30] Foreign Application Priority Data
Dec. 27, 1971 Japan............................. 46-105399

[52] U.S. Cl. ...... 332/7.51; 331/94.5 P; 331/94.5 M; 315/307; 307/253
[51] Int. Cl.² ...................... H01S 3/09; H05B 37/00
[58] Field of Search ...... 332/7.51, 9 T; 331/94.5 M, 331/94.5 P; 315/307; 307/253

[56] References Cited
UNITED STATES PATENTS

| | | | |
|---|---|---|---|
| 3,464,024 | 8/1969 | Bell et al............................ | 332/7.51 |
| 3,530,398 | 9/1970 | Itzkan et al. .................. | 331/94.5 M |
| 3,577,174 | 5/1971 | Longsdorff..................... | 331/94.5 P |
| 3,806,762 | 4/1924 | Punis et al. ........................ | 315/307 |

FOREIGN PATENTS OR APPLICATIONS
1,108,089  4/1968  United Kingdom.................. 323/96

OTHER PUBLICATIONS

White et al., "Excitation Mechanisms and Current Dependence He–Ne Lasers," 12/1/63, pp. 197–199, A.P.L. Vol. 3, No. 11.

Primary Examiner—Maynard R. Wilbur
Assistant Examiner—N. Moskowitz
Attorney, Agent, or Firm—Haseltine, Lake & Waters

[57] ABSTRACT

A device for modulating the intensity of light rays generated from a gas laser in which an input modulating signal is supplied to a switching element included in a modulating current supply source connected across a gas laser discharge tube to control the discharge current and hence modulate the laser light output. The gas laser discharge tube is eventually subjected to the influence of a magnetic field so as to stabilize the laser light output and modulating characteristic.

10 Claims, 12 Drawing Figures

FIG. 3A FACSIMELE INPUT OUTPUT $i_0$  → t
FIG. 3B LIGHT OUTPUT I  → t
FIG. 4
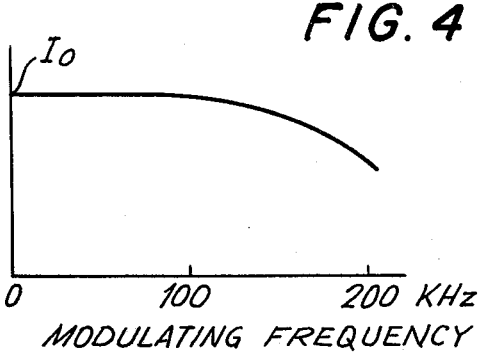
FIG. 5
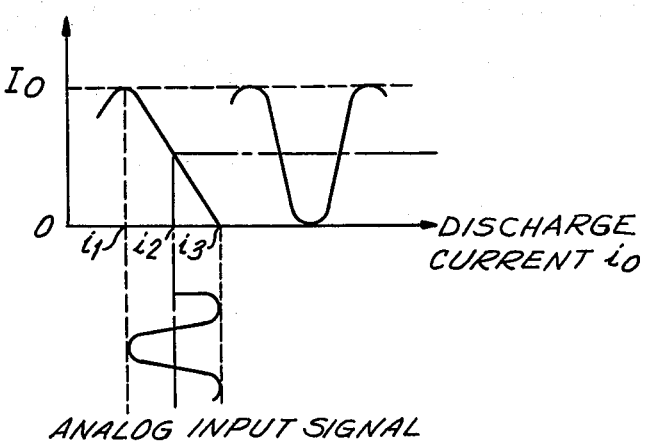

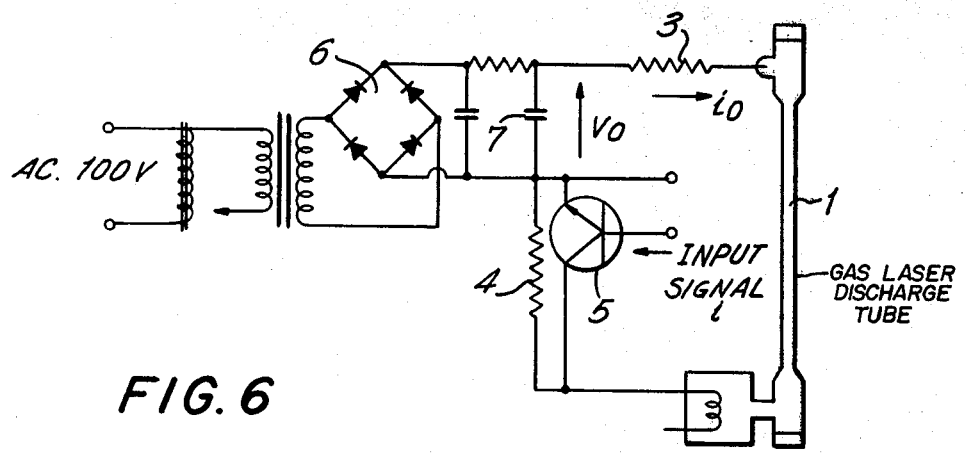
FIG. 6
FIG. 7
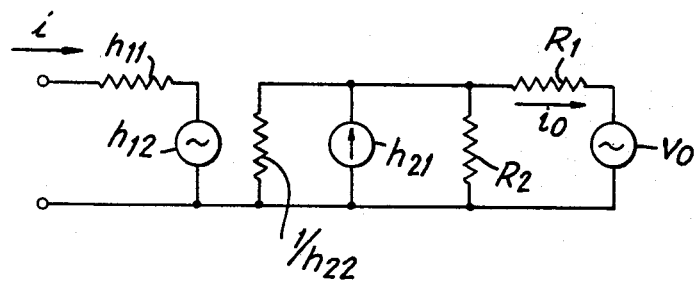

DEVICE FOR MODULATING INTENSITY OF LIGHT RAYS GENERATED FROM GAS LASER

This application is a continuation of co-pending application Ser. No. 289,218 filed Sept. 15, 1972, now abandoned and claiming the priority of the Application filed in Japan on Dec. 27, 1971.

This invention relates to devices for modulating the intensity of light rays generated from a gas laser, and more particularly to a device for modulating the intensity of light rays generated from a gas laser by means of high frequency facsimile signals arriving at facsimile signal receivers.

Heretofore, it has been the common practice to irradiate a suitable opto-electronic crystal with light rays generated from a gas laser and supply an electrical modulating signal to the crystal so as to modulate the intensity of laser light output penetrated through the crystal. Such conventional method has the disadvantage that provision must be made of a special high voltage modulating device in addition to the laser device, and as a result, the device as a whole becomes considerably large and expensive.

In facsimile fields, there has been necessity to increase the facsimile signal receiving speed. The intensity of light rays generated from the conventional light source, however, is too weak to provide satisfactory records in case of increasing the facsimile signal receiving speed, and as a result, it is impossible to modulate the intensity of light rays generated from the conventional light source by means of high frequency facsimile signals. Thus, it has been required to utilize as the above mentioned kind of light source the laser light for the purpose of obtaining intense modulated light rays.

In case of utilizing a gas laser using a mixture of He and Ne and modulating the intensity of light rays generated therefrom and having a wave length of 6328A or in case of providing an optical crystal element arranged in a laser discharge tube and changing the refractive index or polarization state thereof so as to effect the modulation, the laser light output becomes unstable at the time of starting the operation of the laser device or during the use thereof. As a result, the laser device can not be used unless a time of the order of at least 10 minutes has elapsed after the laser device has started its operation. Moreover, when the laser device is used as a facsimile light source, unevenness in differences between light and dark is produced in the printed results. Thus, for example, use in facsimile, for transmitting not only white and black colors but also its intermediate color, it is particularly desirous to stabilize the modulating characteristic. Such unstability is caused by the change in shape of the resonators due to heat radiated from the laser discharge tube. Moreover, the He-Ne laser generates light rays having a wave length of 6328A in the red part of the spectrum and at the same time generates light rays having a wave length of 3.39 $\mu$ in the infrared part of the spectrum, and as a result, the intensity of the light rays of 6328A becomes more or less changeable in dependence with the intensity of the light rays of 3.39 $\mu$, thereby causing the above mentioned unstability in modulating characteristic. Even in multiple mode excitation at 6328A, the excitation at 3.39 $\mu$ causes the laser light output to change when the resonators are subjected to uniform elongation at the time of starting the operation of the laser device. The laser light output is also subjected to outer and inner disturbances during the use of the laser device, thereby making the laser light output and modulating characteristic unstable. In order to obviate such unstability, it might be considered to select those materials constituting resonators which are extremely stable in thermal and mechanical properties. But, such materials are expensive and moreover it is very difficult to sufficiently obviate such unstability.

An object of the invention, therefore, is to provide a device for modulating the intensity of light rays generated from a gas laser, which can effect modulation by means of high frequency signals and hence can be used as a light source for a high speed facsimile receiver, and which is simple and small in construction and less expensive and also reliable in operation.

Another object of the invention is to provide a device for modulating the intensity of light rays generated from a gas laser, by which the laser light output and modulating characteristic can be stabilized in a simple and reliable manner.

These and other desirable objects are attained, according to the invention, by a device for modulating the intensity of light rays generated from a gas laser, comprising a gas laser discharge tube, and a modulating current supply source connected across the gas laser discharge tube, whereby the modulating current supply source is controlled by an input modulating signal such that the discharge current changes within a range from a current value at which the laser light output becomes maximum to a current value which is larger than the above mentioned current value, thereby modulating the intensity of output light generated by the gas laser.

Another feature of the invention is the provision of a device for modulating the intensity of light rays generated from a gas laser, further comprising means for subjecting the influence of a magnetic field to the gas laser discharge tube, the pressure of gas sealed in the gas laser discharge tube being made higher than the optimum gas pressure which makes maximum the laser light output of a laser discharge tube not subjected to the influence of magnetic field.

In one embodiment of the invention, the modulating current supply source may include a direct current supply source connected across the gas laser discharge tube and for supplying the discharge current to the gas laser discharge tube and resistors connected in series with the gas laser discharge tube, and a switching element connected in parallel with one of the resistors, whereby the switching element is controlled by the input modulating signal so as to control the discharge current, thereby modulating the intensity of output light generated from the gas laser.

In the above embodiment, the switching element may be a switching transistor whose collector-emitter path is connected in parallel with one of the resistors and whose base is supplied with the input modulating signal.

In another embodiment of the invention, the means for subjecting the influence of magnetic field to the gas laser discharge tube may consist of electromagnets or permanent magnets arranged near the gas laser discharge tube.

The invention proposes a device for modulating the intensity of light rays generated from a gas laser, which is simple and small in construction and less expensive and also reliable in operation.

The device of the invention is also capable of reducing the preliminary discharge time required to emit the laser light output to the order of 1 minute and of maintaining the modulating characteristic of the laser device during its use in stable state without any fluctuation. Thus, the invention also provides a laser device adapted to effect modulation with an improved stable modulating characteristic.

The invention will now be described with reference to the annexed drawings, in which:

FIG. 3a and 3b illustrates signal waves for showing the relation between facsimile modulating input signal $i$ and laser light output I;

FIG. 4 shows a laser light intensity-modulating frequency-characteristic curve;

FIG. 5 shows laser light output I-discharge current $i_o$ characteristic curves and a curve of analog input signal $i$;

FIG. 6 is a schematic circuit diagram of another embodiment of the device according to the invention;

FIG. 7 is its equivalent circuit diagram;

Figure 1:
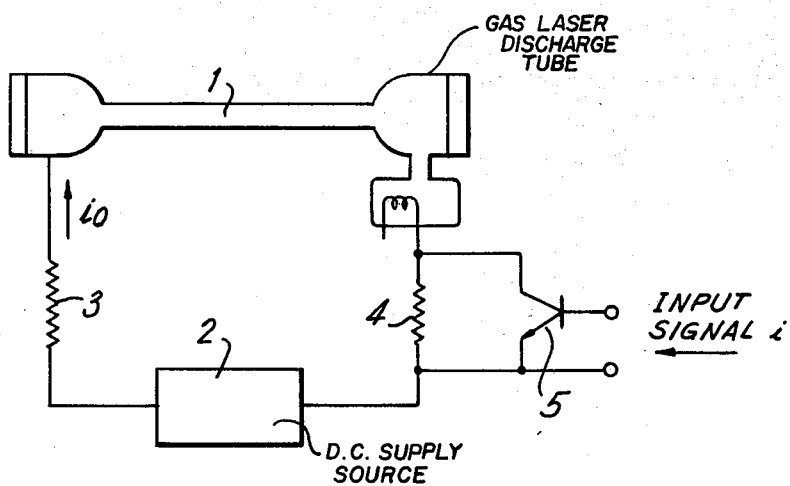
FIG. 1 is a schematic circuit diagram of an embodiment of the device for modulating light rays generated by a gas laser according to the invention.

In FIG. 1 is shown the fundamental construction of a laser device for modulating the intensity of light rays generated from a gas laser according to the invention. Reference numeral 1 designates a gas laser discharge tube across which is connected a direct current supply source 2 for supplying a discharge $i_o$ to the tube 1. Resistors 3 and 4 are connected in series with the direct current supply source 2.

In parallel with one of the resistors 4 is connected a collector-emitter path of a switching transistor 5, the base of which being supplied with an input modulating signal $i$.

Figure 2:
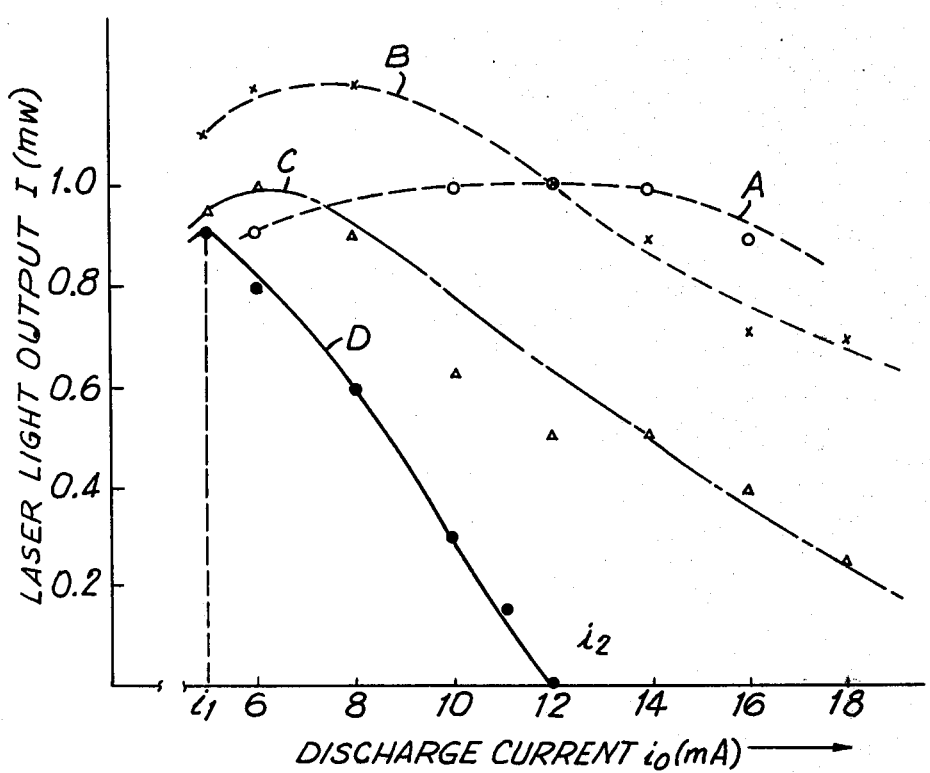
FIG. 2 is laser light output I-discharge current $i_o$ characteristic curves for explaining the operation of the device shown in FIG. 1.

In FIG. 2 are shown laser light output I-discharge current $i_o$ characteristic curves in which a dotted line curve A shows the characteristic when the pressure of gas sealed in the gas laser discharge tube 1 is 1.85 torr, broken line curve B shows the characteristic when the gas pressure is 2.16 torr, dot-dash line curve C shows the characteristic when the gas pressure is 2.76 torr, and full line curve D shows the characteristic when the gas pressure is 3 torr. As seen from FIG. 2, these characteristic curves change in dependence with the pressure of gas sealed in the gas laser discharge tube 1. Thus, in accordance with the invention it is preferable to suitably adjust the pressure of gas sealed in the gas laser discharge tube 1 so as to make these characteristic curves linear and sharp. That is, it is preferable to make these characteristic curves the single as shown by the solid line curve D. But, the modulation of the laser light output I may also be carried out according to the characteristic curves A, B and C. In FIG. 2 $i_1$ is a discharge current value at which becomes maximum the laser light output I and $i_2$ is a discharge current value at which becomes zero the laser light output I.

In the embodiment shown in FIG. 1, the facsimile receiving signal shown in FIG. 3A is supplied as a modulating input signal $i$ to the base of the switching transistor 5. In this case, the presence or absence of the modulating input signal $i$ corresponds to a black or white information of a picture image. If the modulating input signal $i$ is present, the switching transistor 5 becomes conductive to short circuit the resistor 4. Thus, the discharge current $i_o$ flowing through the gas laser tube 1 becomes irrelevant to the resistor 4 and is determined by the equivalent impedance of the resistor 3 and gas laser tube 1. In this case, the discharge current is selected such that it takes a value shown by $i_2$ or a value larger than the value shown by $i_2$ (FIG. 2). That is, the presence of the modulating input signal $i$ causes the discharge current $i_o$ to have the value $i_2$ at which the laser light output I is not produced.

If the modulating input signal $i$ is absent or zero, the switching transistor 5 becomes interrupted so that the discharge current $i_o$ is determined by the resistors 3 and 4. In this case, the discharge current $i_o$ takes the value shown by $i_1$ in FIG. 2. Thus, if the modulating input signal $i$ is zero, the discharge current $i_1$ is capable of producing the maximum light output. Under the above circumstances, if the modulating input signal $i$ shown in FIG. 3A is supplied to the base the the switching transistor 5, the light output I from the laser tube 1 is of one shown by FIG. 3B. That is, the input signal pulses $i$ cause the switching transistor 5 to switch on and off so as to change the discharge current $i_o$ and hence modulate the laser light output I. It is sufficient to supply the modulating input signal $i$ on the order of 0.5 V to 0.7 V in order to make the switching transistor on and off.

As described above, the intensity of the light rays of 6328A becomes more or less changeable in dependence with the intensity of the light rays of 3.39 $\mu$. Thus, it is desirable that provision should be made for means for refraining the gas laser discharge tube 1 from being excited at 3.39 $\mu$. Such means may be constructed by a reflecting mirror located at each end of the gas laser discharge tube 1 and a glass plate located between the reflecting mirrors at the Brewster's angle to the optical axis of the gas laser discharge tube 1 and for absorbing the excitation at 3.39 $\mu$.

As stated hereinbefore, the invention provides a device for modulating the intensity of light rays generated from a laser tube, which is extremely simple in construction and reliable in operation.

In FIG. 4 is shown a decrease of the laser light intensity when the laser light is modulated at a frequency range from 0 to 200 KHz with the intensity of laser light rays without modulation $I_o$ taken as a standard intensity. As seen from FIG. 4 the decrease of the laser light intensity is comparatively small up to the modulating frequency of 200 KHz and, particularly, the laser light intensity up to the modulating frequency of about 120 KHz is substantially constant without showing any decrease.

On the contrary, the conventional device for modulating the intensity of light rays emanated from the conventional light source by means of the oscillation subjected to a galvanomirror is limited in its modulating frequency to the order of 20 KHz. If the modulation were effected by such conventional device at a frequency higher than 20 KHz, the light intensity should considerably be decreased, and as a result, the conventional device could not be used in practice.

It might be considered to use a laser light source whose output light passes through an electronic-optical element so as to modulate the laser light output. Such device, however, has the disadvantage that the electronic-optical element must be driven by a high voltage modulating signal, and as a result, the modulating device becomes considerably large and expensive, and that the laser light is attenuated when passing through the electronic-optical element to decrease the amount of light rays. Such disadvantage can be obviated by the modulating device according to the invention.

In the above mentioned embodiment, use is made of digital facsimile signal containing black and white informations as a modulating signal, but the invention may also use an analog modulating signal. In FIG. 5 is shown laser light output I-discharge current $i_o$ curves in case of using the analog modulating signal $i$. That is, if the operating point is determined to that point on the laser light output-discharge current characteristic curve which corresponds to $$i_a = \frac{i_1 + i_2}{2}$$

and the analog modulating signal $i$ changes in sine wave form and the discharge current $i_o$ changes from $i_1$ to $i_2$, then the laser light output I changes from 0 to $I_o$. In this case, if the laser light output-discharge current characteristic curve is made linear, it is possible to effect linear modulation.

In FIG. 6 is shown another embodiment of the modulating device according to the invention. In this embodiment, provision is made for a full wave rectifier 6 adapted to supply a direct current voltave $V_o$ across a condenser 7. In FIG. 7 is shown an equivalent circuit of the embodiment shown in FIG. 6 wherein use is made of h parameters of the switching transistor 5. Then, the discharge current $i_o$ caused by the modulating input signal $i$ may be controlled by the following formula $$i_u = \frac{\left(R_2 + \frac{1}{h_{22}}\right)V_o + \left\{\left(R_2 + \frac{1}{h_{22}}\right)R_2 h_{21} - R_2^2 h_{21}\right\}i}{(R_1 + R_2)\left[R_2 + \left(\frac{1}{h_{22}}\right)\right] - R_2^2}$$

where $R_1$ and $R_2$ are values of the resistors 3 and 4, respectively.

Figure 8:
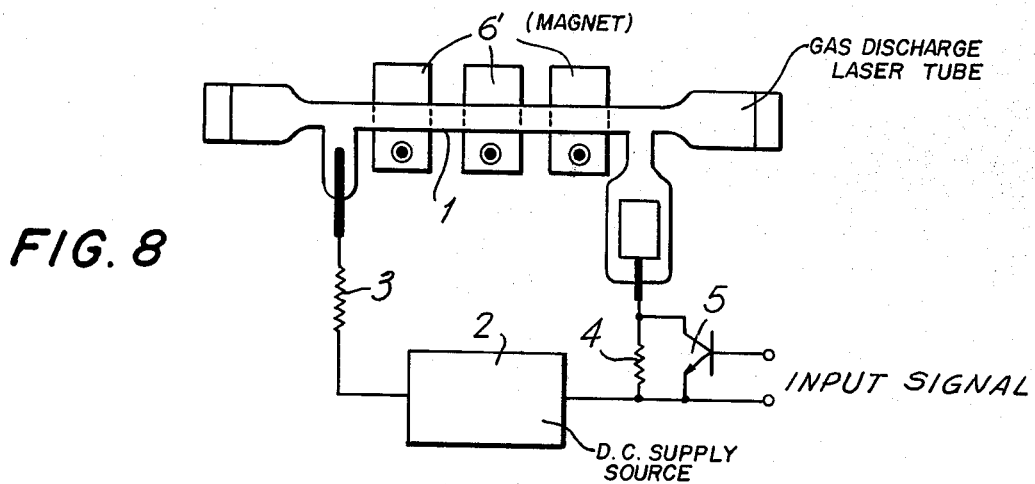
FIG. 8 is a schematic circuit diagram of a further embodiment of the device according to the invention.

In FIG. 8 is shown a further embodiment of the laser device according to the invention, in which provision is made for magnets 6 near the gas laser discharge tube 1 for the purpose of subjecting the influence of magnetic field to the gas laser discharge tube 1.

Figure 9:
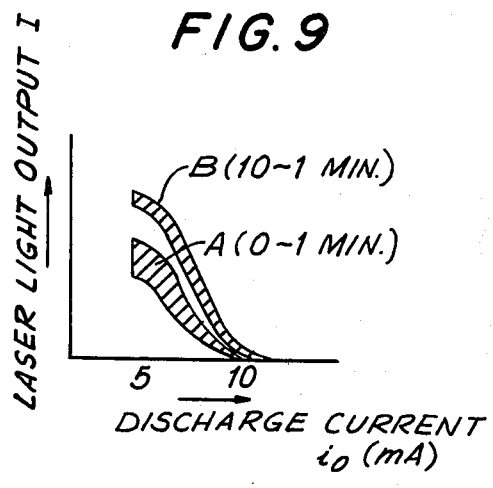
FIG. 9 shows laser light output I-discharge current $i_o$ characteristic curves of a laser device without subjected to the influence of magnetic field.

If the laser device is not subjected to the influence of a magnetic field, the laser light output I changes in dependence with the discharge current $i_o$ as shown in FIG. 9. That is, the laser light output I changes as shown by a shaded region A during a period from 0 to 1 minute after the laser device has started its operation, and changes as shown by another shaded region B during a period from 10 to 11 minutes after the laser device has started its operation. Thus, the laser light output I is kept changed in dependence with the discharge current $i_o$ even after the lapse of period from 10 to 11 minutes.

In accordance with the invention, the presence of He-Ne gas sealed in the gas laser discharge tube 1 shown in FIG. 8 is made higher than the optimum gas pressure under which becomes maximum the laser light output of a laser device not subjected to the influence of the magnetic field and provision is made for magnets 6' (or equivalent devices for producing the magnetic field) near the gas laser discharge tube 1. The magnetization of these magnets 6 in a direction vertically upwards from the plane of drawing is denoted by dot in circle. The intensity of the magnetic field produced by each magnet 6 is made equal. The direction of magnetization is not limited to that shown in FIG. 8. The direction opposite to that shown in FIG. 8 or any other directions may also be adopted and the intensity of magnetic field of each magnet 6' may be made unequal to each other.

The mixing ratio of He-Ne gas used in the gas laser discharge tube 1 may be He:Ne=5:1 under a pressure of 3 to 4.3 mmHg, the discharge tube 1 having an inner diameter of 1 to 2 mm$\phi$ with the axial distance between the resonators of 15 cm to 30 cm.

Figure 10:
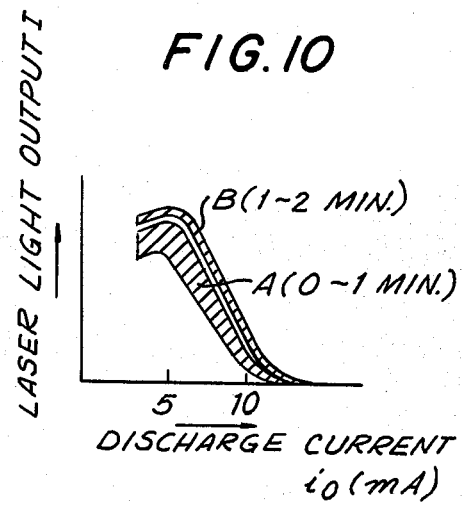
FIG. 10 shows similarly to FIG. 9 laser light output I-discharge current $i_o$ characteristic curves of a laser device subjected to the influence of magnetic field.
Figure 11:
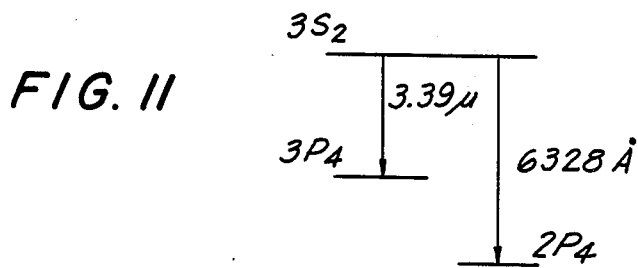
FIG. 11 is a graph showing energy levels of Ne of a gas laser discharge tube using a mixture of He-Ne.

In FIG. 10 are shown $i_o$-I characteristic curves of the laser device shown in FIG. 8. As seen from FIG. 10, the laser light output I changes as shown by a shaded region A during a period from 0 to 1 minute after the laser device has started its operation, but after the lapse of time from 1 to 2 minutes after the laser device has started its operation it becomes stable as shown by a shaded region B and remains its stable region B during the use, thereby opposing fluctuation of the the position and shape of the I-$i_o$ characteristic curve being fluctuated.

As seen from FIGS. 9 and 10 that value of the discharge current $i_o$ of the gas laser discharge tube subjected to the influence of magnetic field which makes the laser light output I maximum becomes larger than that of the gas laser discharge tube not subjected to the influence of a magnetic field. In order to make such value of the discharge current $i_o$ smaller, the sealing gas of the laser discharge tube subjected to the influence of the magnetic field is made higher than that of the laser discharge tube not subjected to the influence of a magnetic field, as described above. It is most preferable to make the sealing gas pressure higher by 1 to 2 mmHg than the optimum pressure under which the laser light output generated from the gas laser discharge tube not subjected to the influence of magnetic field becomes maximum. The increase of the sealing gas pressure ensures an increase of number of collisions between the atoms, and as a result, it is expected that the life of energy level of $2P_4$ becomes short, and that the frequency characteristic can be improved.

As stated hereinbefore, the use of the magnetic field subjected to the laser discharge tube and of the sealing gas pressure which is higher than that sealed in the laser discharge tube not subjected to the influence of magnetic field ensures a stabilization of the laser light output and modulations characteristic of a He-Ne laser device for effecting internal modulation and generating red light having a wave length of 6328A and further provides the important advantage that the sealing gas pressure can be increased in an extremely easy manner, and that the magnetic field can simply be obtained by magnets, for example, electromagnets or permanent magnets.

The invention is not limited to the above mentioned embodiments and various modifications may be made.

For example, various kinds of modulating current supply sources may be used and switching elements other than a switching transistor may also be used. The invention is not limited to current modulation only and may be applied to internal modulation type laser devices in general. For example, the invention may effectively be applied to a laser device comprising a laser discharge tube in which is arranged an optical crystal element whose refractive index or polarization state is changed to effect the internal modulation.

What is claimed is:

1. A device for rapidly modulating at frequencies up to 200 KH$_z$ the intensity of light rays generated by a gas laser for picture image transmission, said device comprising an He-Ne gas laser discharge tube connected across the secondary side of a transformer, the pressure of gas sealed being of the order of 3 to 4.3 torr, and a modulating current supply source connected across said gas laser discharge tube and controlled by an input modulating signal such that the discharge current changes within a range from a current value at which the laser light output becomes maximum to a current value which is larger than said current value, said current source including a direct current supply source connected across said gas laser discharge tube for supplying discharge current to said gas laser discharge tube, resistors connected in series with said direct current supply source, and a switching transistor connected in parallel with one of said resistors, whereby said switching transistor is controlled by said input modulating signal so as to control the discharge current, thereby modulating the intensity of output light generated from said gas laser.

2. A device as claimed in claim 1 wherein said switching transistor has a collector-emitter path connected in parallel with one of said resistors and a base supplied with said input modulating signal.

3. A device as claimed in claim 1 wherein the pressure of gas sealed in said gas laser discharge tube is of the order of 3 Torr.

4. A device as claimed in claim 3 and further comprising means for preventing said He-Ne gas laser discharge tube form being excited at 3.39 $\mu$.

5. A device as claimed in claim 1 further comprising means for preventing said He-Ne gas laser discharge tube from being excited at 3.39$\mu$.

6. A device as claimed in claim 5 and further comprising means for subjecting the influence of a magnetic field to said He-Ne gas laser discharge tube, the pressure of gas sealed in said He-Ne gas laser discharge tube being made slightly higher than the optimum gas pressure which maximizes the laser light output from a laser discharge tube not subjected to the influence of magnetic field.

7. A device as claimed in claim 5 wherein said means for preventing said He-Ne gas laser discharge tube from being excited at 3.39$\mu$ comprises a reflecting mirror located at each end of said gas laser discharge tube, and a glass plate located between said reflecting mirrors at the Brewster's angle to the optical axis of said gas laser discharge tube and for absorbing the excitation at 3.39$\mu$.

8. A laser device as claimed in claim 6 wherein said means for subjecting the influence of a magnetic field to the He-Ne gas laser discharge tube comprises magnets arranged near said He-Ne gas laser discharge tube.

9. A device as claimed in claim 1 wherein the mixing ratio of the He-Ne gas in the gas laser discharge tube is He:Ne=5:1, the discharge tube having an inner diameter of 1 to 2 mm$\phi$ with an axial distance between resonators of 15 to 30cm.

10. A device as claimed in claim 1 wherein said discharge current has a magnitude supplied to said switching transistor to provide laser light frequency between 120 and 200 KHz.

* * * * *